US010238252B2

(12) United States Patent
Buczek

(10) Patent No.: US 10,238,252 B2
(45) Date of Patent: Mar. 26, 2019

(54) DUST COLLECTOR FOR A DRILL PRESS OR SYSTEM

(71) Applicant: Christopher Joseph Buczek, Carmel, IN (US)

(72) Inventor: Christopher Joseph Buczek, Carmel, IN (US)

( * ) Notice: Subject to any disclaimer, the term of this patent is extended or adjusted under 35 U.S.C. 154(b) by 606 days.

(21) Appl. No.: 14/712,902

(22) Filed: May 14, 2015

(65) Prior Publication Data

US 2015/0360298 A1 Dec. 17, 2015

Related U.S. Application Data

(60) Provisional application No. 61/993,867, filed on May 15, 2014.

(51) Int. Cl.
*A47L 7/00* (2006.01)
*B23B 47/34* (2006.01)
*B23Q 11/00* (2006.01)

(52) U.S. Cl.
CPC ........ *A47L 7/0095* (2013.01); *B23Q 11/0046* (2013.01); *B23B 2270/30* (2013.01); *Y10T 408/50* (2015.01)

(58) Field of Classification Search
CPC ............... A47L 7/0095; B23B 2251/68; B23B 2260/058; B23B 2270/30; B23B 2270/62; B23B 31/001; B23B 47/34; B23Q 11/0046; B23Q 11/0071; Y10T 408/453
USPC ........................................................ 15/301
See application file for complete search history.

(56) References Cited

U.S. PATENT DOCUMENTS

| 994,430 A | 6/1911 | Tunks | |
| 2,122,517 A * | 7/1938 | Curtis | B23Q 11/006 173/60 |
| 2,245,859 A * | 6/1941 | Hunter | H05K 7/00 15/300.1 |
| 2,339,324 A | 1/1944 | Fischer | |

(Continued)

FOREIGN PATENT DOCUMENTS

| FR | 1415708 A * | 10/1965 | ........... B23B 31/001 |
| WO | WO 2012045110 A1 * | 4/2012 | ........... B23B 45/003 |

*Primary Examiner* — Joseph J Hail
*Assistant Examiner* — Arman Milanian
(74) *Attorney, Agent, or Firm* — Indiano & McConnell LLC; E. Victor Indiano; John T. Woods, III

(57) ABSTRACT

A drill removal device is provided for use with a scratch generating tool having a stationary member and a scrap generating workpiece engaging member that is moveable with respect to the stationary member. The debris removal device includes a bracket having a stationary member receiving portion for coupling the bracket to the power tool stationary member. A vacuum receiving portion of the bracket is provided for coupling the bracket to a vacuum source, and a passageway portion is provided for placing the stationary portion in fluid communication with the vacuum source. A variable tube bellows is configured for placement adjacent to the workpiece engaging member. The bellows includes a plurality of bi-stable pleats that are moveable between and stationarily positionable in each of an expanded position and a compressed position for permitting the user to vary the length of the bellows between, and fixedly positioned the length of the bellows at a plurality of different lengths.

20 Claims, 13 Drawing Sheets

(56) References Cited

U.S. PATENT DOCUMENTS

| | | | | |
|---|---|---|---|---|
| 2,792,199 A * | 5/1957 | Becker | B23Q 11/0053 | 175/211 |
| 3,301,293 A * | 1/1967 | Santelli | B65D 1/0292 | 220/666 |
| 3,339,435 A * | 9/1967 | Heitz | B23B 31/001 | 144/252.1 |
| 3,340,869 A * | 9/1967 | Bane | A61M 3/00 | 206/364 |
| 3,583,821 A * | 6/1971 | Shaub | B23Q 11/0053 | 144/252.1 |
| 3,850,254 A * | 11/1974 | Hirdes | B23Q 11/0046 | 173/75 |
| 3,897,604 A * | 8/1975 | Weimer | B23Q 11/006 | 15/344 |
| 3,934,661 A * | 1/1976 | Sauerwein | B23Q 11/0053 | 175/211 |
| 3,936,213 A * | 2/1976 | Kappel | B23Q 11/0053 | 175/211 |
| 3,939,887 A * | 2/1976 | Scarnato | B65D 1/0292 | 206/218 |
| 3,939,888 A * | 2/1976 | Scarnato | B65D 1/0292 | 206/218 |
| 4,111,208 A * | 9/1978 | Leuenberger | A61B 17/1624 | 408/1 BD |
| 4,209,069 A | 6/1980 | Smith | | |
| 4,848,980 A * | 7/1989 | Broussard | B23Q 11/0053 | 408/67 |
| 4,921,375 A * | 5/1990 | Famulari | B23Q 11/0046 | 144/252.1 |
| 4,955,984 A * | 9/1990 | Cuevas | B23Q 11/0053 | 408/67 |
| 5,061,123 A | 10/1991 | Broussard | | |
| 5,090,499 A | 2/1992 | Cuneo | | |
| 5,113,951 A | 5/1992 | Houben et al. | | |
| 5,129,467 A | 7/1992 | Watanabe et al. | | |
| 5,160,230 A * | 11/1992 | Cuevas | B23Q 11/0053 | 408/67 |
| 5,292,210 A * | 3/1994 | Nowick | B23B 51/0426 | 408/204 |
| 5,356,245 A * | 10/1994 | Hosoi | B08B 15/04 | 408/56 |
| 5,452,628 A | 9/1995 | Montgomery, Jr. et al. | | |
| 5,467,835 A | 11/1995 | Obermeier et al. | | |
| 5,571,246 A * | 11/1996 | Alldredge | A61M 15/0086 | 128/200.14 |
| 5,653,561 A * | 8/1997 | May | B23Q 11/0046 | 408/67 |
| 5,688,082 A * | 11/1997 | Richardson | B23Q 11/0046 | 408/113 |
| 5,765,654 A * | 6/1998 | Burger | B23Q 11/0053 | 144/252.2 |
| 5,904,453 A * | 5/1999 | Gavia | B23Q 11/0046 | 408/124 |
| 5,988,954 A * | 11/1999 | Gaskin | B23Q 11/0046 | 408/67 |
| 6,079,078 A * | 6/2000 | Byington | B23Q 11/0046 | 144/252.1 |
| 6,086,292 A | 7/2000 | Yokoyama | | |
| 6,193,448 B1 * | 2/2001 | Brennan | B23Q 11/0053 | 408/67 |
| 6,379,091 B1 | 4/2002 | Queipo | | |
| 6,830,113 B2 * | 12/2004 | Moore | B23Q 11/0046 | 173/171 |
| 6,854,937 B1 | 2/2005 | Weiss | | |
| 6,932,129 B2 * | 8/2005 | Hess | B24B 19/007 | 144/136.95 |
| D542,312 S * | 5/2007 | Skradski | D15/138 | |
| D542,313 S * | 5/2007 | Skradski | D15/138 | |
| 7,369,916 B2 | 5/2008 | Etter et al. | | |
| 8,052,357 B2 | 11/2011 | Bruntner | | |
| 8,113,747 B2 | 2/2012 | Miyanaga | | |
| 8,479,354 B1 | 7/2013 | Doyle | | |
| 8,529,170 B2 | 9/2013 | Everington, Jr. | | |
| 8,740,513 B2 | 6/2014 | Santamarina et al. | | |
| 2005/0000052 A1 * | 1/2005 | Byles | A47L 9/02 | 15/314 |
| 2006/0147284 A1 * | 7/2006 | Kim | B23B 49/008 | 408/68 |
| 2007/0065242 A1 * | 3/2007 | Skradski | B23Q 11/0046 | 408/67 |
| 2007/0243031 A1 * | 10/2007 | Yun | B23B 47/00 | 408/67 |
| 2007/0261195 A1 * | 11/2007 | Bleicher | B08B 15/04 | 15/344 |
| 2007/0264091 A1 * | 11/2007 | Bleicher | B23Q 11/0046 | 408/58 |
| 2010/0155095 A1 * | 6/2010 | Furusawa | B23Q 11/0046 | 173/198 |
| 2011/0008117 A1 * | 1/2011 | Kasuya | B23Q 11/0046 | 408/67 |
| 2011/0008118 A1 * | 1/2011 | Yoshikane | B23Q 11/0046 | 408/67 |
| 2011/0081214 A1 * | 4/2011 | Santamarina | B23B 49/005 | 408/67 |
| 2011/0266015 A1 * | 11/2011 | Ohlendorf | B23Q 11/0046 | 173/198 |
| 2012/0063856 A1 * | 3/2012 | Miwa | B23Q 11/0046 | 408/67 |
| 2012/0121354 A1 * | 5/2012 | Dickey | B23B 31/02 | 409/131 |
| 2012/0142263 A1 * | 6/2012 | Burdick | B23Q 11/0046 | 454/66 |
| 2012/0311815 A1 * | 12/2012 | Pickens | A47L 5/38 | 15/414 |
| 2013/0034396 A1 * | 2/2013 | Witthoeft | B23Q 11/0071 | 408/67 |
| 2013/0094915 A1 * | 4/2013 | Chen | B23Q 11/0071 | 408/67 |
| 2014/0037392 A1 * | 2/2014 | Lo | B23Q 11/0071 | 408/67 |
| 2014/0093320 A1 * | 4/2014 | Sullivan | B23Q 11/0046 | 408/67 |
| 2016/0045686 A1 * | 2/2016 | Jaroslavsky | A61M 15/0088 | 128/200.23 |

* cited by examiner

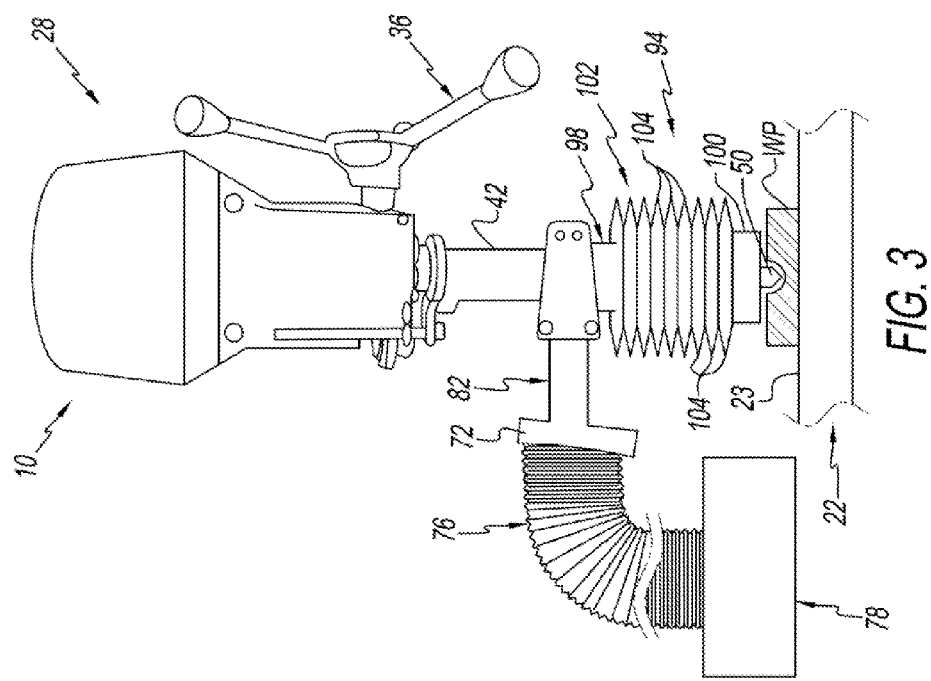
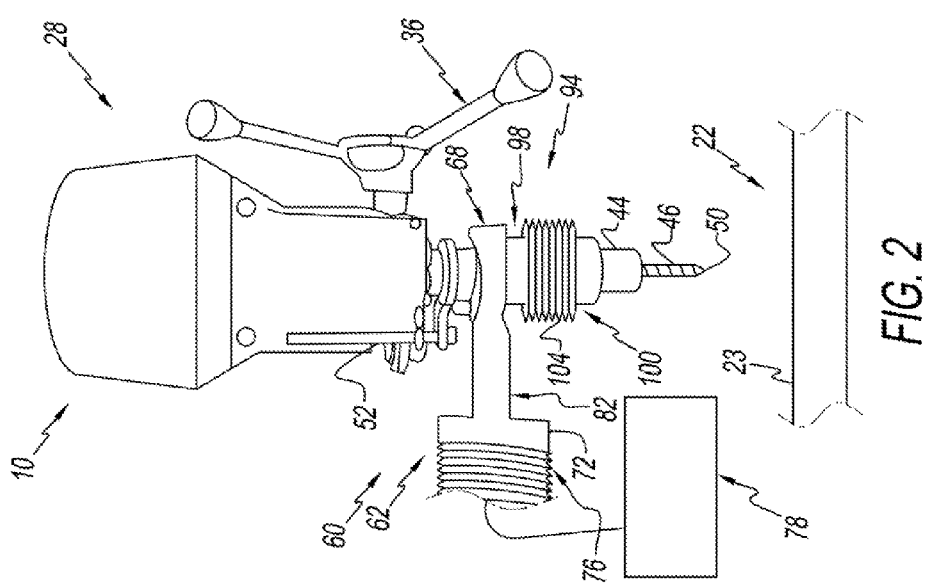

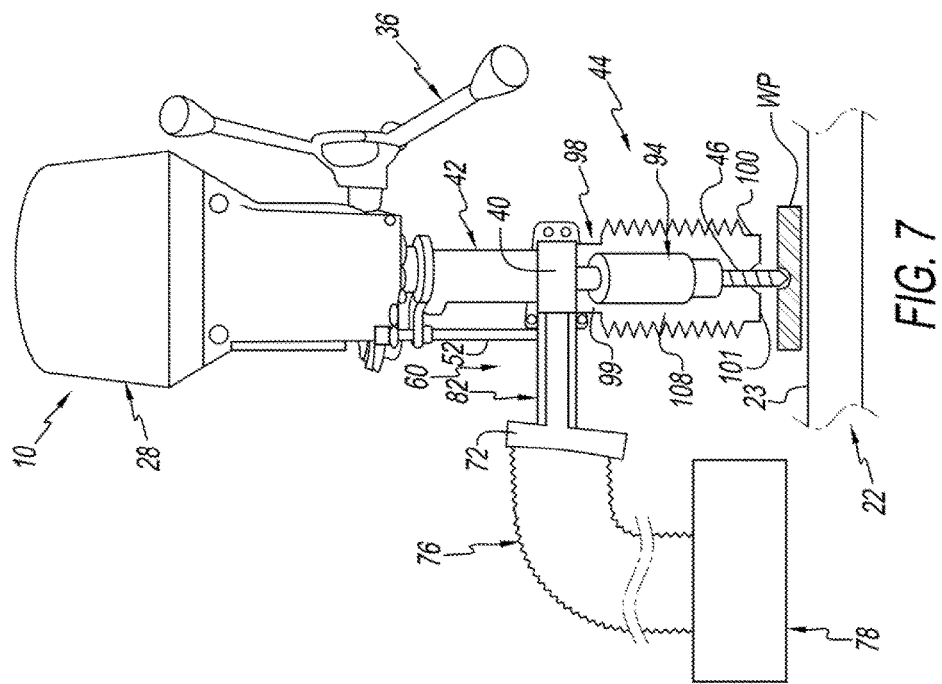
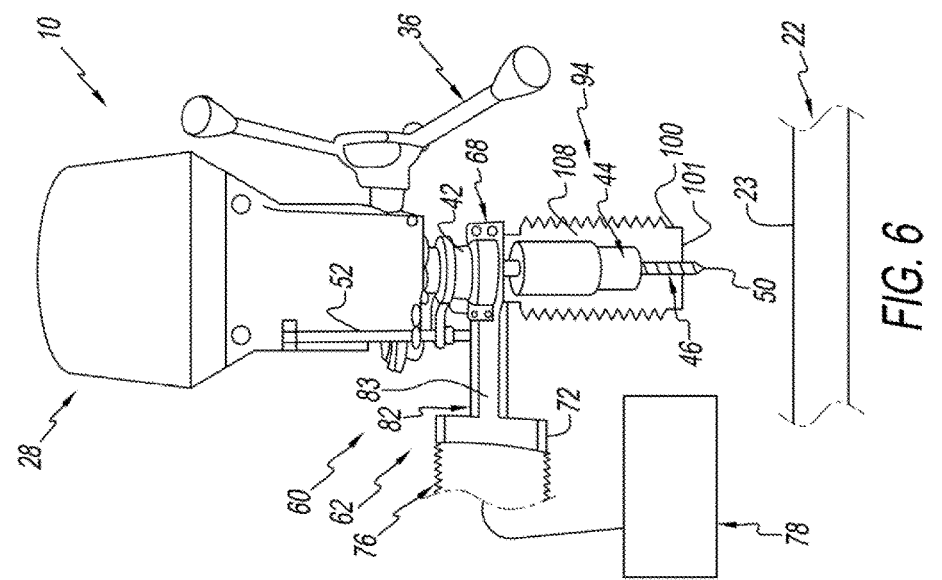

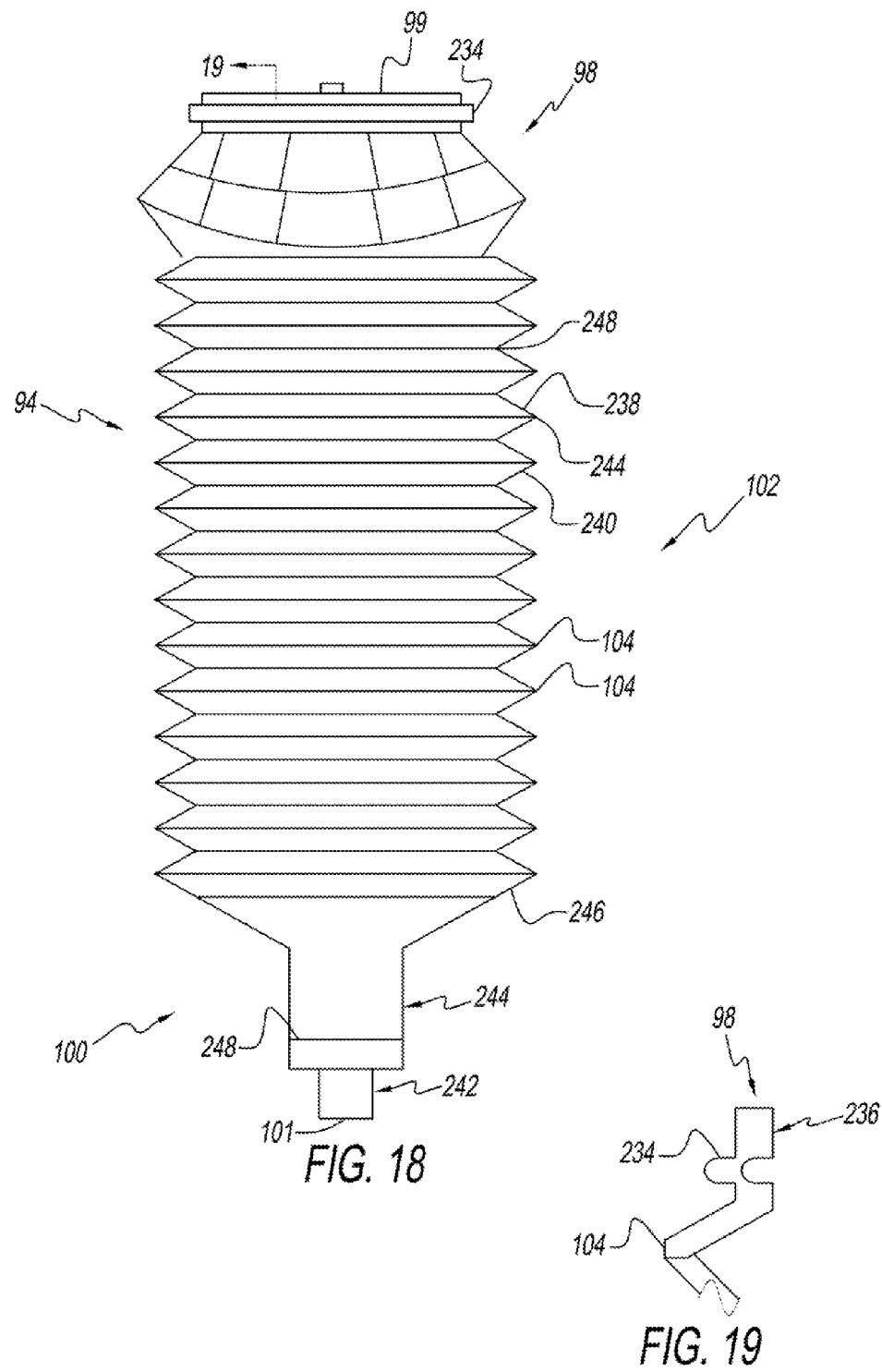

DUST COLLECTOR FOR A DRILL PRESS OR SYSTEM

CLAIM OF PRIORITY

This application claims benefit and priority to Christopher Joseph Buczek, U.S. Provisional Patent Application Ser. No. 61/993,867, filed 15 May 2014 which application is fully incorporated herein.

I. TECHNICAL FIELD OF THE INVENTION

The present invention relates to accessories for use on power tools, and more particularly, for a dust collection system useable with power tools that s especially adaptable for uses on drills and drill presses.

II. BACKGROUND OF THE INVENTION

A drill press is a tool upon which a drilling function is performed on a work piece, such as a piece of wood, steel or other material. The drill press usually includes a table member. A motor housing is positioned above the table and includes a motor for rotating a spindle that rotates a drill chuck. A drill bit is mounted to the chuck that is rotated by the spindle. The chuck and drill bit are mounted above the table and are movably vertically between a disengaged position where the drill bit is spatially separated from the workpiece and a lowered position where the drill is positioned adjacent to the table or workpiece. The drill bit can be lowered to engage the workpiece so that the drill can perform an operation on the workpiece.

The drill press generally includes a rotatable drill bit member that has a generally vertical axis, and that spins about that vertical axis. A drill bit is carried within the drill member, and includes a distal cutting edge, and side surfaces that are grooved to help carry away the scrap that is normally carried away with the debris that font's when the drill press engages a piece of material of the workpiece.

To operate the drill press, one places a workpiece to be operated on the upper surface of the table. One then moves the drill and chuck downwardly from their disengaged position to their engaged position by moving the axially movable drill press quill. The quill is a vertically moveable, stationary member that houses the rotatable spindles. During this time, the spindle, chuck and drill bit are spinning. When the distal edge of the drill bit engages the workpiece, the cutting edge of the drill bit forms a hole in the workpiece. This hole is formed by the removal of the workpiece material (e.g. wood, metal, plastic, etc) from the area of the workpiece.

Normally, the debris that is being dislodged through the engagement of the drill with the workpiece takes the form of a powder, dust or shavings, depending upon the material and the configuration of the drill bit. Because of the manner in which the drill works by rotating about its axis, these debris pieces are scattered generally 360 degrees around the workpiece. Therefore, after drilling a hole, one is usually left with a significant amount of scattered workpiece debris that should be cleaned.

The dust and debris created by the drill not only creates a mess to clean up, but can also cause a health hazzard. Many of the debris pieces are very small and very fine and can become airborne particulates that can find their way into the Lungs and digestive tract of the user.

Although wood debris can block passages in the lining and ultimately harm the lungs over a period of long exposure, the effects of wood are not as deleterious as some other materials such as metal or toxic metals that have the potential to could cause greater physical harm. Nonetheless, wood dust is recognized as a known carcinogen by the Occupational Safety and Health Administration.

As such, it is a laudable goal to try to prevent the dust from becoming airborne by collecting the dust and disposing of the dust in a manner to minimize the amount of dust that has the potential to be ingested by the drill operator.

Products exist that have been employed remove the dust that are known to the applicant.

A typical way for removing dust is to affix a vacuum hose somewhere close to the table on which the drill press is operating. The hose then is positioned close to one side of the drill press table and through a vacuum force sucks the dust and debris into the vacuum for transfer later to a dust bag or other debris container that one might find on a typical vacuum product such as a Shop-Vac® brand wet/dry vacuum device.

Although such debris removal systems do help to remove dust, room for improvement exists. In particular, known debris removal systems are often inefficient at removing dust, because there a significant spatial separation exists between the intake of the vacuum hose and the place where the drill engages the workpiece to create the debris. This spatial separation may prevent the vacuum hose from efficiently inhaling all the dust that is being created.

One object of the present invention is to create a more efficient dust removal system.

III. SUMMARY OF THE INVENTION

In accordance with the present invention, a drill removal device is provided for use with a scrap generating tool having a stationary member and a scrap generating workpiece engaging member that is moveable with respect to the stationary member. The debris removal device comprises a bracket having a stationary member receiving portion for coupling the bracket to the power tool stationary member. A vacuum receiving portion of the bracket is provided for coupling the bracket to a vacuum source, and a passageway portion is provided for placing the stationary position in fluid communication with the vacuum source.

A variable length tubular bellows is provided that is configured for placement adjacent to the workpiece engaging member. The bellows includes a plurality of bi-stable pleats that are moveable between and stationarily positionable in each of an expanded position and a compressed position for permitting the user to vary the length of the bellows between, and fixedly positioned the length of the bellows at a plurality of different lengths.

In a preferred embodiment, each of the plurality of pleats is individually moveable between a compressed rest position and an expanded rest position to permit the user to vary the length of the bellows between a full expanded length, a fully compressed length, and a plurality of intermediate lengths.

In a most preferred embodiment, the debris removal device is designed for use in connection with a power tool that comprises a drill or a drill press. The tubular bellows is sized to have an interior that is large enough to receive a chuck and a drill bit, and is easily snap fit to the bracket to enable the user to facilitate easy access to the chuck, by quickly removing and replacing the bellows on to the bracket One feature of the present invention is that a tubular bellows with expandable, bi-stable pleats is employed in the debris removal device. This feature has the advantage of helping to both provide more efficient debris removal, while being widely adaptable to a large number of workpiece engaging bits, such as drill bits of different lengths and diameters.

Because of the variable length, the user can place the distal end of the bellows when in use, at a position close to the point at which the drill bit engages the workpiece, such as the board on which a hole is being drilled. By placing the distal end of the bellows close to the workpiece, and surrounding the drill bit, the vacuum force exerted by the vacuum source pulls air through the distal end of the bellows, is positioned at a point where the distal end of the bellows is close to the scrap material that is being created by the working drill bit. Additionally, as the bellows is co-axially positioned to surround the drill bit, the bellows does not get in the user's way when working on the workpiece, or obstruct his vision.

Another advantage obtained by the use of the pleated bellows is that the position can be fixed in a one of a variety of rest positions, so that the bellows will maintain its intended length at a particular position without the exertion of an external force. This feature has the position of freeing up the user's hands. She can position the bellows at a particular desired length, knowing that it will remain there throughout the operation, without having to exert force on the bellows such as by holding it in a position. By doing this, the user's hands are freed up.

Another feature of the present invention that it includes a snap-fit connection between a bellows coupler and bracket coupler that couples the bellows and bracket together. This snap-fit arrangement then enables the bellows to be quickly coupled onto the bracket member and removed from the bracket member, without requiring the bracket member to be removed from a position on the quill or other stationary member of the device.

One situation where this feature comes in handy is where the drill bit is being changed on the chuck. Another situation where this feature comes in handy that it helps to facilitate the replacement of the bellows member. It is envisioned that the thin plastic character of the bellows member, and its proximity to a drill bit member will cause the bellows member to wear out at a much quicker rate than the bracket member. When such a placement is needed, the old bellows member can be removed quite easily from the bracket member and a new bellows member coupled to the bracket member with relatively little effort and little expenditure of time. Importantly, this can be accomplished without the need to remove the bellows member from the bracket.

These and other features of the present invention will become apparent to those skilled in the art upon a review of the drawings, and detailed description of the present invention as discussed below.

III. BRIEF DESCRIPTION OF DRAWINGS

FIG. 2 is a front view of the drill press with the debris removal device of the present invention attached thereto, and with the bellows shown in the substantially fully compressed position;

FIG. 3 is a front view of the drill press and debris removal device of the present invention, but showing the drill bit in its lowered or workpiece engaging position, and the tubular bellows in its substantially expanded position;

FIG. 6 is a front view of the drill press with the debris removal device attached, wherein the tubular bellows is shown in section and in its substantially expanded position, and the drill bit is shown in its raised position;

FIG. 7 is a frontal sectional view of the drill press having the debris removal device attached, similar to FIG. 6, except that FIG. 7 shows the drill member lowered into its workpiece engaging position;

FIG. 18 is a front view of the tubular bellows of the present invention showing the bellows in its expanded position;

FIG. 19 is a sectional view taken along lines 19-19 of FIG. 18;

V. DETAILED DESCRIPTION OF THE DRAWINGS

Figure 1:
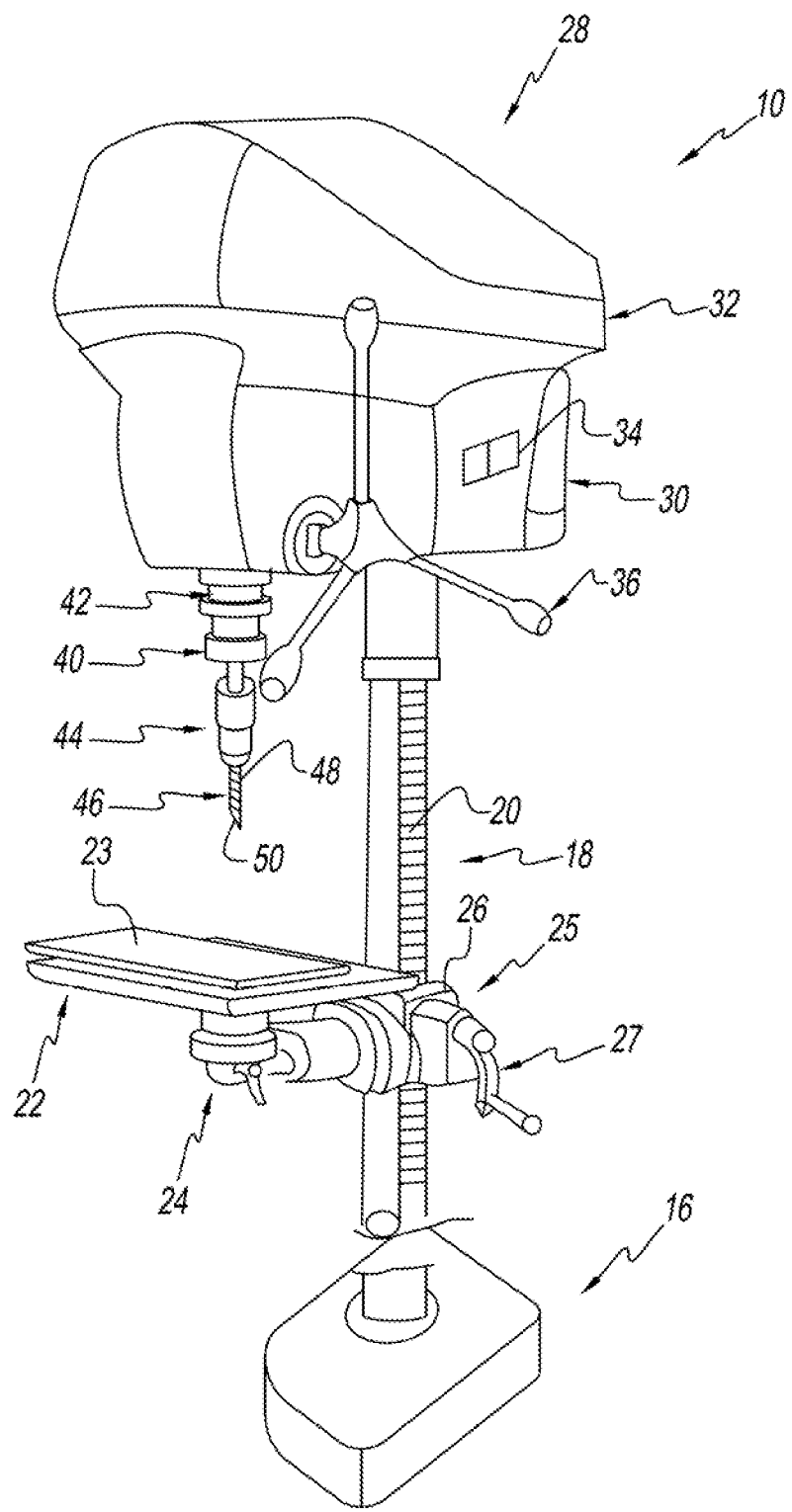
FIG. 1 is a perspective view of a drill press, that can comprise the power tool to which the debris removal device of the present invention can be coupled.
Figure 4:
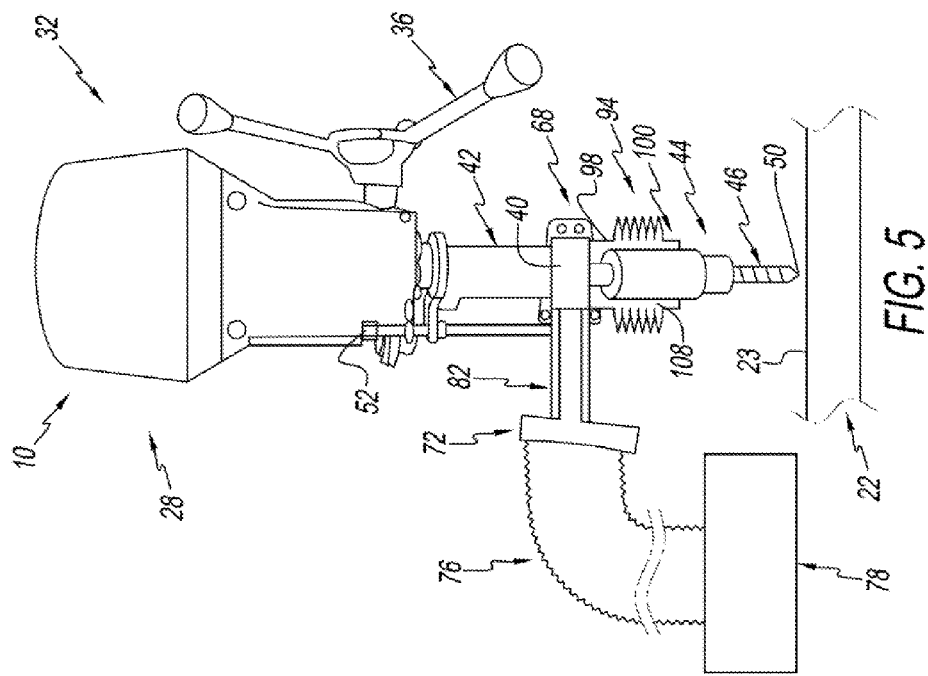
FIG. 4 is a front view of the drill press with the debris removal device coupled thereto and the drill bit positioned in the upraised position, and the tubular member in the compressed position, wherein the tubular member is shown in cross-section.
Figure 5:
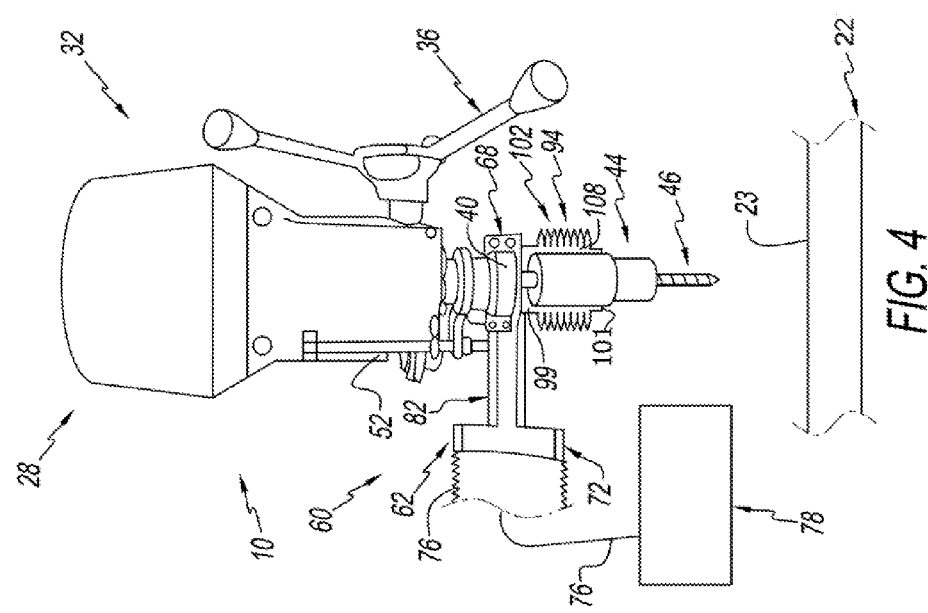
FIG. 5 is a front view of the drill press with the tubular bellows member in the compressed position similar to FIG. 4, except with the drill bit being lowered into the workpiece engaging position.

The description that follows describes, illustrates and exemplifies one or more particular embodiments of the present invention in accordance with its principles. This description is not provided to limit the invention to the embodiment or embodiments described herein, but rather to explain and teach the principles of the invention in such a way to enable one of ordinary skill in the art to understand these principles and, with that understanding, be able to apply them to practice not only the embodiment or embodiments described herein, but also other embodiments that may come to mind in accordance with these principles.

The scope of the present invention is intended to cover all such embodiments that may fall within the scope of the appended claims, either literally or under the doctrine of equivalents.

It should be noted that in the description of the drawings, like or substantially similar elements may be labeled with the same reference numerals. However, sometimes these elements may be labeled with differing reference numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Furthermore, certain views are side views which depict only one side of the device (or one set of components of a multi set array of components), but it will be understood that the opposite side and other component sets are preferably identical thereto. The present specification is intended to be taken as a whole and interpreted in accordance with the principles of the present invention as taught herein and understood by one of ordinary skill in the art.

The present invention comprises a debris removal device 60 that is used in connection with a power tool, such as a drill press 10. Turning first to FIGS. 1-7, components and operation of a drill press will be to help the reader better understand the environment in which the device 60 of the present invention works.

Figure 22:
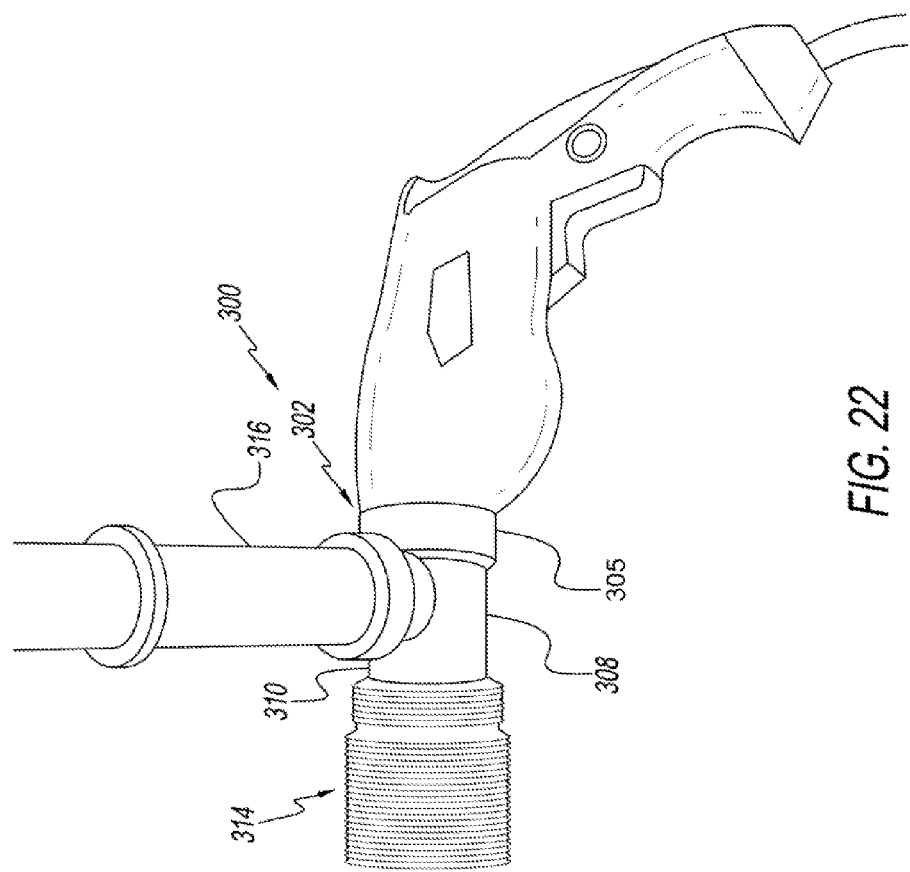
FIG. 22 is a side perspective view of an alternate embodiment of the debris remover of the present invention.

As shown in FIG. 22, the debris removal device 300 can also be used in connection with a portable drill, along with a plurality of other power tool devices, such as rotary tools, routers, spiral saws, cutout tools, mortise machines, engravers, rotary hammers, sanders, lathes, oscillating tools, saws, routers and others.

Returning to FIG. 1, the drill press 10 includes a base 16 for supporting the drill press on a floor or other horizontal surface such as a work bench top. A vertically extending column 18 has abuse end that is coupled to the base 16, and an upper end that is coupled to the head unit 28 of the drill press 10. The column 18 includes a plurality of gears 20 for facilitating the vertical movement of a table 22 having an upper surface 23. The upper surface 23 is sized and configured to hold a work piece, such as a board, wood sheet, metal sheet, extruded metal strip, plate or the like, upon which a drill press can perform an operation. The extent of devices and the manner in which a drill press performs operations upon work pieces are well known in the art and the literature. An exemplary drill press is shown in Etter et al., U.S. Pat. No. 7,369,916 that is incorporated herein.

A table height adjustor 25 can travel vertically along the column 20 and includes a gearing mechanism (not shown) to interact with the gears 20 on the column to facilitate this vertical movement and to help maintain the table 22 in its proper vertical position when it is adjusted to the correct height. A table locking clamp 26 is provided for fixedly positioning the vertical position of the table 22 on the column, and a crank 27 is rotatable by the user to engage the gears 20 to move the table up and down along the column.

A table positioner, elbow mechanism 24 is provided to enable the user to tilt and adjust the table 22 to a desired angle, relative to horizontal.

A head 28 is coupled to the top end of the column 18. The head unit 28 includes a variety of driving control mechanisms that are used in connection with the drill press 10. The unit area 28 includes a motor containing area 30 that contains an electric motor with a rotating output shaft. In most drill presses, the motor (not shown) includes a vertical output shaft that extends upwardly, and that is coupled to a pulley for turning a drive belt.

The head unit 8 also includes a pulley container area 32 that contains the belt that extends between the driving pulley on the motor and a driven pulley (not shown) on the spindle that ultimately turns the drill bit 46.

A switch 34 is placed on the head 28 to control the operation of the drill press 10 such as by turning it on and off. Although a simple on/off switch 34 is shown on the drill press 10, it will be appreciated that the control can be quite complex, computer programmed, or otherwise configured to enable the operation of the drill press more variable, or more repeatable.

Examples of such controls can be better understood by a review of patents and other prior art that is directed primarily to controls for drill presses on drill presses, such as the Etter '916 patent described above.

A feed lever 36 is provided for vertically lowering and raising the drill bit 46. The workpiece engaging drill bit 46 is moveable by the feed lever from a raiser or retracted position as shown in FIG. 1, downwardly into an engaged position, such as shown in FIG. 3. When in the engaged position, the drill bit 44 is positioned to an operate on the workpiece WP. When operating on the workpiece, the drill typically forms a hole in the wood piece WP, by removing material from the workpiece WP. The so removed material comprises scrap or debris. Because of the high speed and 360 degree rotation of the drill 46, the scrap dislodged from the workpiece WP (FIG. 3) is typically scattered about the workpiece WP in a 360 degree arc. As stated above, this scattering of the debris creates a significant mess for the user, and airborne contaminants for those in the area.

The output assembly of the drill press 28 includes stationary parts, rotatable parts and vertically moveable parts.

A spindle member 42 comprises the primary output shaft of the drill press. The spindle includes a pulley at its upper end for receiving the drive belt that is ultimately driven by the drive pulley of the motor. The spindle extends along and rotates about a generally vertical axis. The spindle is vertically moveable relative to the drill press by the action of the feed lever.

The quill 40 has a central aperture and bearing structure that it sized and positioned to receive the spindle so that the spindle may be rotatably received within the quill 40. The quill 40 is generally, stationarily positioned insofar as it docs not rotate, generally stationary, while the spindle 42 rotates with respect to the quill 40. Additionally, the quill 40 is vertically moveable so that the movement of the feed lever 36 to move the spindle 42 downwardly and upwardly, causes similar downward and upward movement of the quill 40.

A chuck 44 is fixedly coupled to the distal end of the spindle 42 to rotate with the spindle 42. The chuck comprises a coupler for coupling a workpiece engaging moveable member (drill bit 46) to the chuck 44 and ultimately to the spindle 42 so that rotation of the spindle 42 rotates the drill bit 46.

A variety of chucks exist. A typical chuck includes a variable diameter receiving aperture that is designed to accommodate a wide variety of drill bits having different diameters.

A chuck mechanism permits the user to vary the diameter, to increase the diameter to a point wherein a desired drill bit can be either removed from or inserted into the chuck 44. Once the desired drill bit is inserted into the chuck 44, the diameter of the aperture is reduced by the user to a point wherein the chuck 44 snugly and fixedly engages the radially outwardly facing exterior surface of the drill bit 44. Preferably, the chuck 44 is designed so that the drill bit 46, when fully engaged, will be securely maintained within the chuck and will become dislodged from the chuck 44 during an operation.

The debris removal device 60 of the present invention is useable with a scrap generating power tool such as the drill press 10 described above. The drill press 10 has a stationary member (quill) 40 and a workpiece engageable member such as drill bit 46 that can engage with a workpiece WP.

The debris removal device 60 includes a bracket 62 that is preferably made from a molded plastic. The bracket 62 has a stationary receiving portion such as a quill receiving ring 68, for receiving and engaging the quill 40 of the drill press 10. A vacuum receiving portion 72 is also generally ring-like, and is disposed at the opposite end of the bracket 62, and has an axis that is generally perpendicular to the axis of the stationary member receiving ring 68.

The vacuum receiving portion 72 is sized and positioned for receiving a vacuum hose 76 that includes a distal end that is coupled to the vacuum receiving portion 72, and a proximal end that is coupled to the intake side of a vacuum device 78. An example of a vacuum device that will work well with the present invention is any one of a variety of Wet/Dry Vacs that are available from a variety of sources including those sold under the "Shop-Vac" brand.

The bracket 60 includes a passageway portion 82 that extends between the vacuum receiving portion 72 and the stationary member receiving portion 68. The passageway portion 82 includes an interior passageway 83 that places the vacuum receiving portion 72 in fluid communication with the stationary member receiving portion 68. This permits the vacuum 78 to create a negative air pressure to thereby draw air from the stationary member receiving portion 68, through the vacuum hose 76 and into the vacuum 78. The stationary member receiving portion is coupled to and in fluid communication with a tubular bellow 94, that includes a proximal portion 98, and open proximal end 99, a distal portion 101 disposed adjacent to the workpiece engaging drill bit 46, and an open distal end 100. The tubular bellows 94 also includes a middle portion 102 disposed between the proximal portion 98 and the distal portion 100 that includes a plurality of bi-stable pleats 104.

The pleats 104 are movable between and stationarily positionable in each of an expanded position (see FIG. 7), and a compressed position (see FIGS. 4 and 5) for permitting the user to vary the length of the bellows 94 between, and fixedly position the length of the bellows 94 at a plurality of different lengths. In this regard, it will be noted that one can see the differences in length when the bellows 94, 98 pleats 104 are in their compressed position as shown in FIG. 2, and when the pleats 104 are in their expanded position as shown in FIG. 3.

The bellows 94 is hollow and tubular, with a hollow open distal end 101. The tubular bellows 94 is also in fluid communication with the interior of the stationary member receiving portion 68. As such, an uninterrupted fluid passageway, through which air can be drawn exists from the open distal end 101, through the hollow interior 108 of the tubular bellows 94, through the interior of the stationary receiving portion 68 of the bracket 60, through the central passageway 83 of the passageway portion 82, through the vacuum receiving portion 72, the vacuum hose 76, and into the vacuum device 78.

Figure 11:
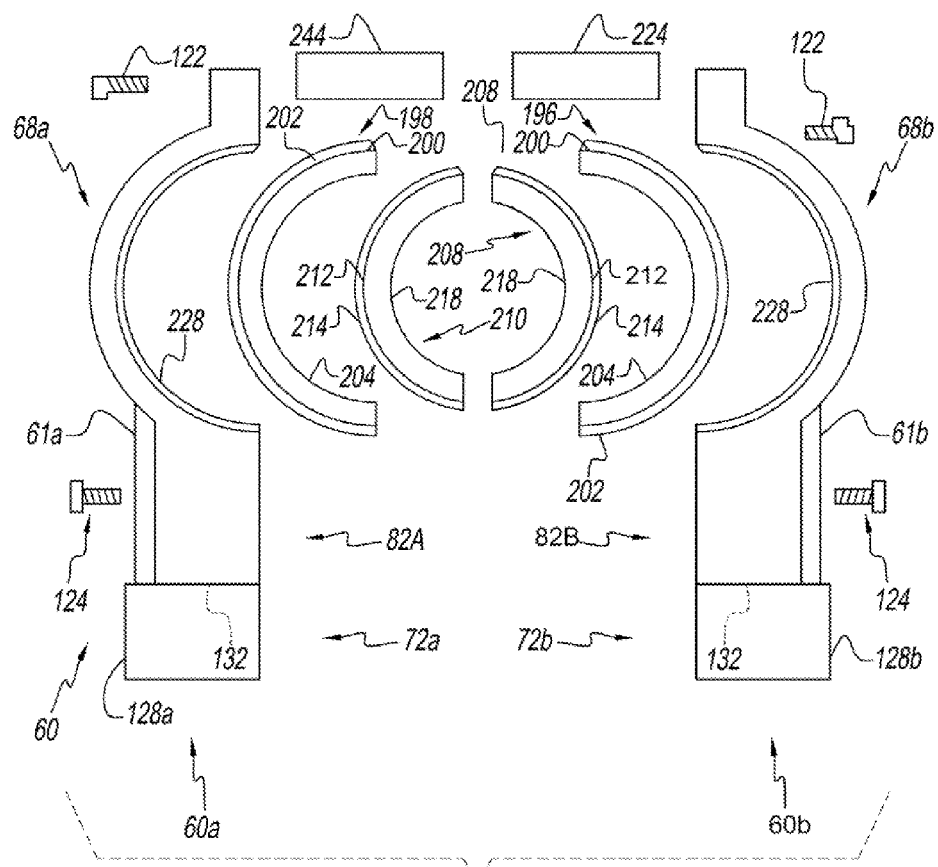
FIG. 11 is an exploded, bottom view of the bracket member of the present invention.
Figure 12:
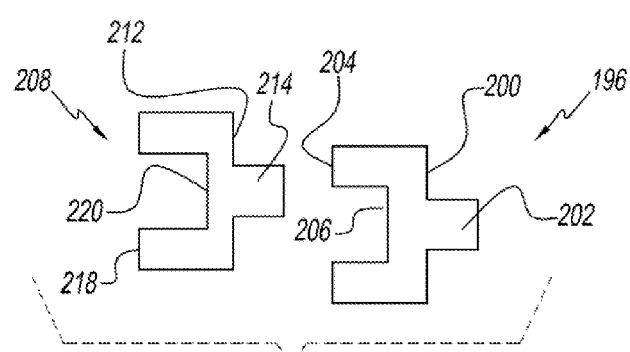
FIG. 12 is an exploded view of the bushing members of the bracket.

As best shown in FIG. 11, the bracket 60 is comprised of two identical bracket halves 61A, 61B. Bracket halves 61A, 61B can be made out of the same mold cavity, as they are preferably made to be identical when molded. As will be discussed in more detail below, the bracket 68 is modified, such as by the insertion of threaded metal sleeve (not shown), that are provided for receiving the fasteners 122, 124 to securely threadedly engage them in repeatable manner to the bracket 60.

The bracket 62 is formed in two pieces 61A, 61B and is held together by the fasteners 122, 124. In order to engage the stationary members 68A, 68B onto the quill 40, one loosens the screws 122, 124 and places the stationary ring over the quill 40. The screws 122, 124 are loosened sufficiently so that the stationary member receiving portions 68A, 68B have a diameter large enough to receive the quill 40. Once it is so fit over, the screws 122, 124 can be tightened to securely engage the stationary member 68 to the quill 40.

The bracket halves 61A, 61 each include a hemi-cylindrical vacuum engaging portion 72A, 72B. The vacuum receiving portion 72A, 72B has a circular, cylindrical wall 132.

By being able to be made in two identical halves 62A, 62B, the halves 62A, 62B can be formed out of the same mold cavity thus saving mold costs. Additionally, by making the device in two identical halves, the diameter of the stationary receiving portion and the vacuum receiving portion can be expanded or reduced. One situation where this ability to expand the stationary diameter receiving portion 68 becomes important is when the chuck of the drill has a diameter that is larger than the diameter of the stationary receiving portion 68 of the bracket 62. In such cases, the bracket halves 62A, 62B can be unscrewed, so that the halves 62A, 62B are separated. The bracket halves 62A, 62B can then be joined back together in a position proximal of the clutch and re-fastened. If the two halves 62A, 62B were not separable, one would have difficulty because one likely would not be able to slide the stationarily member receiving portion over the chuck 44, and therefore, would be unable to position it 68 so that it could be attached to the quill 40 of the drill.

The vacuum hose 76 can be affixed to the vacuum receiving portion 72a in a manner wherein the screws 122, 124 are loosened to expand the diameter of the vacuum tube receiving portion 72. When the vacuum tube receiving portion 72 has increased to its desired diameter, the vacuum hose 76 can be inserted within the cylindrical walls 128 so that the distal end of the vacuum hose engages the disk-shaped, radially outwardly facing wall 132 of the bracket 68. At such point, the screws 122, 124 are tightened on the bracket 68 to reduce the diameter of the vacuum receiving portion 72, to thereby snugly hold the vacuum tube 76 onto the vacuum hose receiving portion 72.

Alternately, the vacuum hose 76 can be sized to have a diameter slightly larger than the diameter of the cylindrical wall 128 of the vacuum hose receiving portion 72, so that the vacuum hose 76 can interiorly receive the vacuum tube receiving portion 72a.

Depending upon the snugness of the fit, and the elasticity of the vacuum hose, this over-laying arrangement may be enough to maintain the vacuum hose on to the vacuum hose receiving portion 72A, 72B. Alternately, a hose clamp, such as a conventional radiator hose clamp, can be placed over the hose to snugly tighten the vacuum hose onto the exterior surface of the cylindrical walls 128 of the vacuum tube receiving portion 72.

Fortunately, most vacuum hoses have a standard diameter, so that a variety of vacuum hoses from different manufacturers will fit well on the clamp. Vacuum hoses used with wet-dry vacs typically have a 2.25 inch exterior that is capable of being interiorly received into the 2.25 inch preferred interior diameter of the vacuum portion 72. Also, the vacuum portion 72 has a preferred exterior diameter of 2.5 inches which will exteriorly accept the interior diameter of many common dust collector hoses.

Further, such hoses have varied lengths. With the device, the length of the vacuum hose necessary depends largely upon the particular arrangement used. If a particular wet-dry vac is assigned to a particular machine, the vacuum hose may only need to be four or five feet long to extend between the bracket and the vacuum device 78. On the other hand, if a central vacuum is used to service a plurality of machines, the vacuum hose may need to be substantially longer to extend to either a larger collector pipe or a central vacuum unit (not shown).

It should also be rioted that adapters can be coupled to the vacuum tube receiving portion 72A, 72B, so that the diameter or cross-sectional shape of the vacuum hose receiving portion 72a can be varied to adapt well with the particular vacuum hose size and configuration that the user desires to attach to the bracket.

The passageway portion 82 includes a T-shaped upper member 136 and a T-shaped lower member 142. The T-shaped upper member includes a sheet portion having a planar outer surface 138, that is disposed in a parallel plane with a planar outer surface 144 of the sheet portion of the T-shaped lower member. An upstanding wall portion of the T-shaped upper member 140 connect the oval cross section passageway portion 150 to the sheet portion having the planar upper surface. Similarly, the upstanding wall portion 146 extends primarily in a direction perpendicular to the outer surface 144, and extends between the sheet-like portion and the oval cross section member 150. The oval cross section member 150 defines an oval shaped passageway, that places the vacuum tube receiving portion in fluid communication with the stationary member receiving portion 68.

Figure 8:
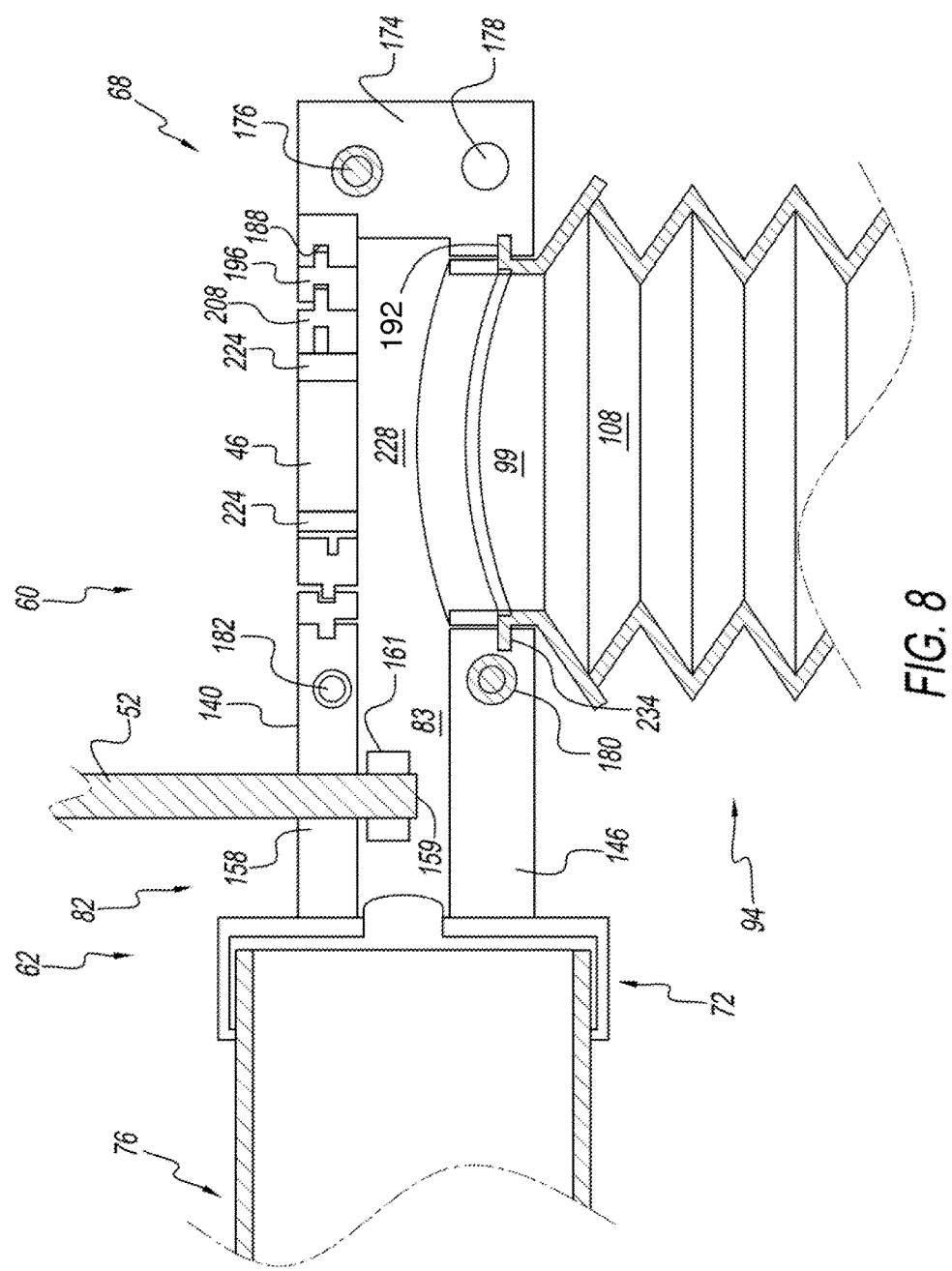
FIG. 8 is a front, sectional view of the bracket member and tubular bellows of the present invention.
Figure 9:
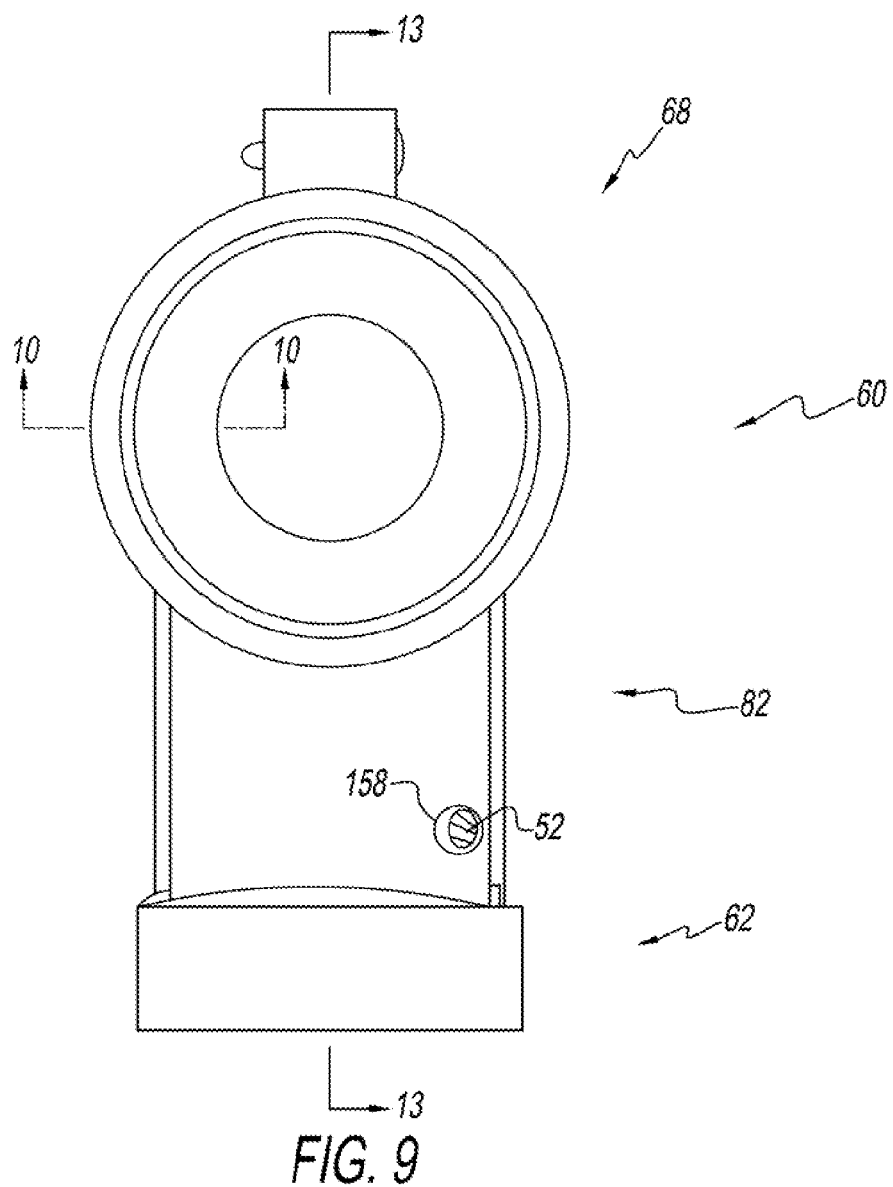
FIG. 9 is a bottom view of the bracket member.
Figure 10:
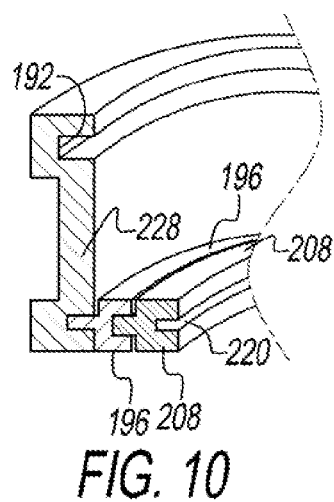
FIG. 10 is a sectional view taken along lines 10-10 of FIG. 9.

As best shown in FIG. 8, The T-shaped upper member that includes a sheet portion having a planar outer surface 138 may include an aperture 158 that is sized and positioned for receiving the distal end 159 of the depth stop rod 52. The depth stop rod 52 can be inserted through the aperture 158, and a nut 161 affixed thereto, so that the device 60 moves in sync with the depth stop rod 52 and thereby enables the depth stop rod 52 to perform its intended function of limiting the vertical travel of the quill 40 and drill bit 46. The aperture 158 is positioned to place the depth stop rod 52 exteriorly of the passageway interior 83.

The operation of the stationary member receiving portion 68 of the bracket 62 is best described in connection with FIGS. 11 and 13.

The primary feature of the stationary member receiving portion 68 is a cylindrical ring 162, having an outer surface 164 and an inner surface 166. Additionally, the stationary receiving portion 68 includes an end portion 174. End portion 174 includes a pair of apertures, including a sleeved aperture 176 and an unsleeved aperture 178 for receiving the fasteners 122. The threaded sleeve 166 includes an insert, such as a threaded brass insert for receiving the threads at distal end of the fastener 122. The unthreaded aperture 178 generally is provided for receiving the proximal (head) end of the fastener 122. It will also be noted that a pair of corresponding apertures 180 (sleeved) and 182 (unsleeved) are provided at the proximal end of the central passageway portion 82, for receiving fasteners 124.

Figure 13:
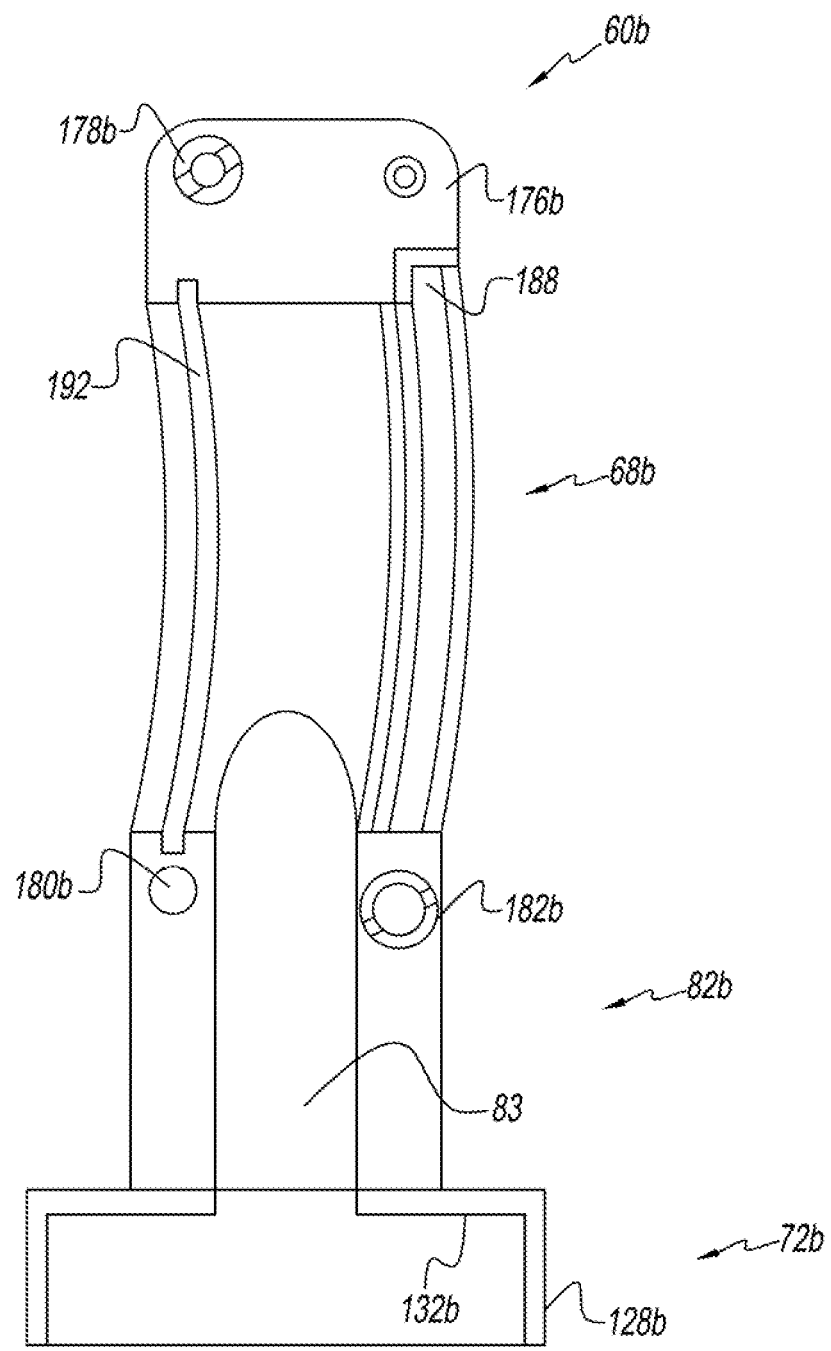
FIG. 13 is a sectional view taken along lines 13-13 of FIG. 9.
Figure 14:
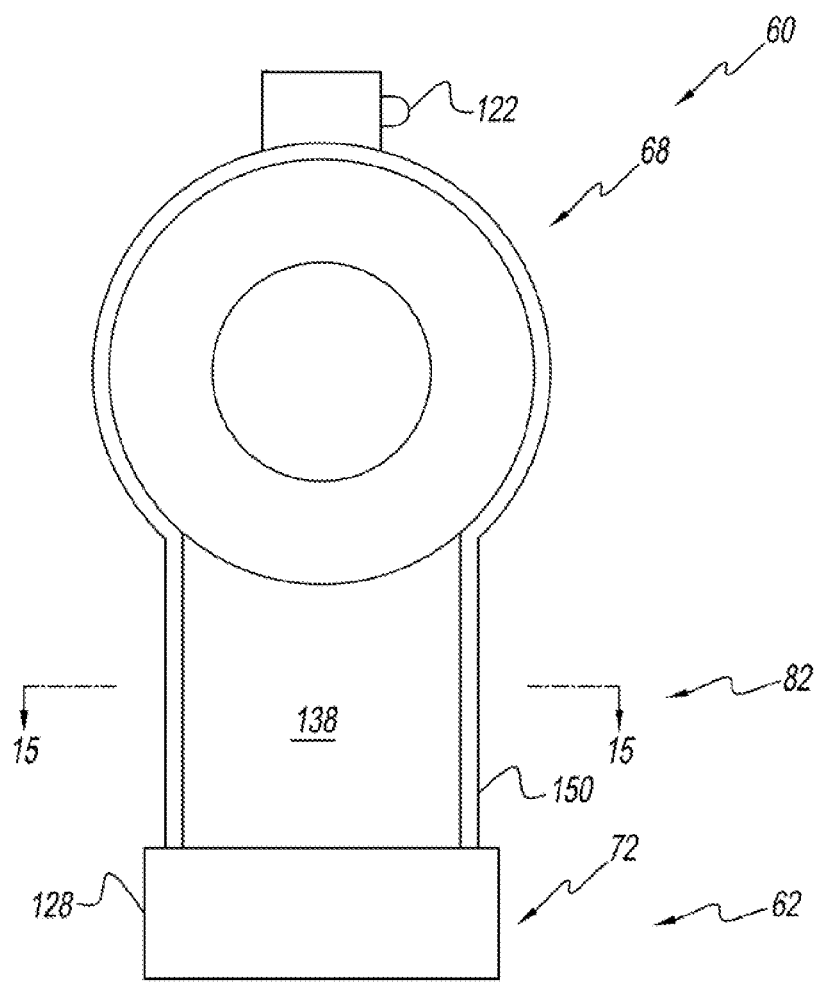
FIG. 14 is a top view of the bracket member of the present invention.
Figure 15:
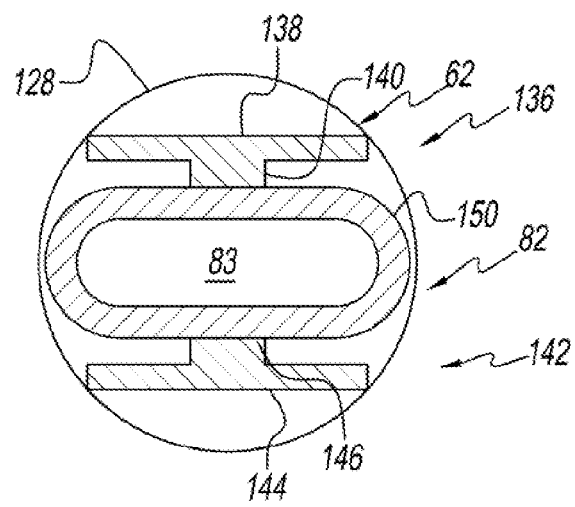
FIG. 15 is a sectional view taken along lines 15-15 of FIG. 14.
Figure 16:
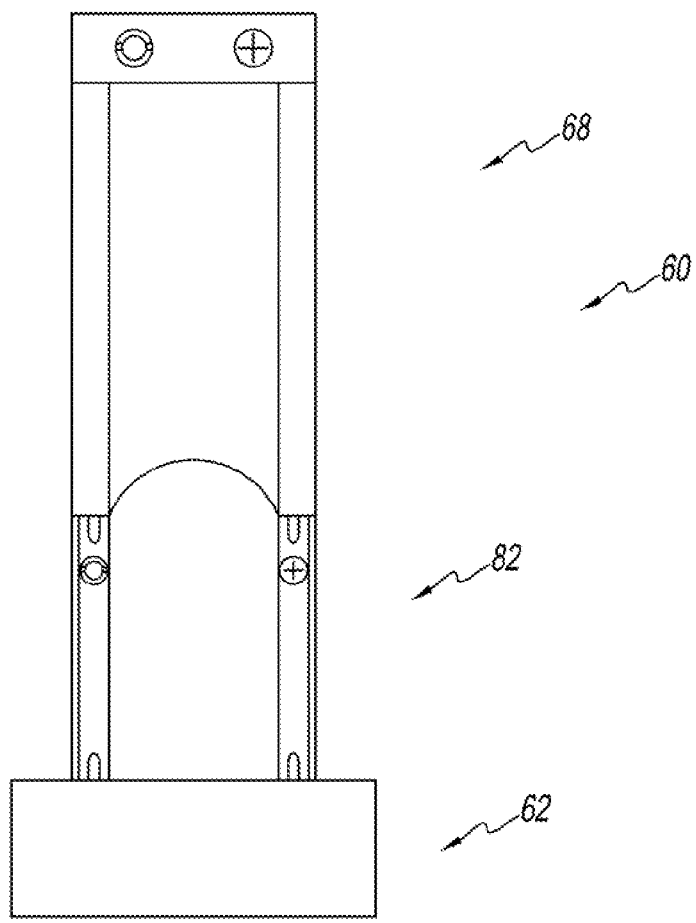
FIG. 16 is a side view of the bracket member of the present invention.
Figure 17:
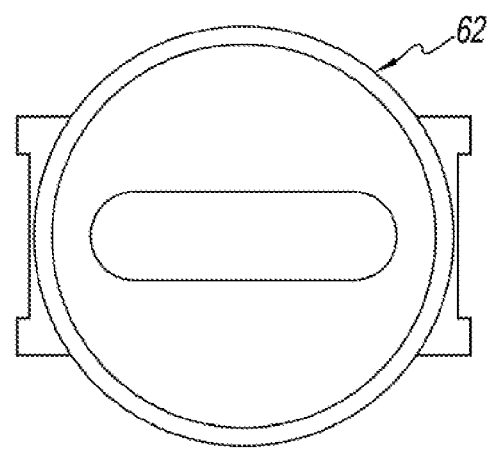
FIG. 17 is a left side view of the bracket member of the present invention showing the vacuum source coupler.

The corresponding apertures 176B, 178B, 180B and 182B that correspond in the second bracket half 62B with the apertures 176, 178, 180, 182 (FIG. 8) are best shown in FIG. 13. It will be noted that apertures 182B and 178B include a threaded metal sleeve, to receive the threaded ends of the fastener members where as apertures 176B, 180B do not include threaded sleeves, as they tend to receive the proximal portion of the screw that are inserted through these apertures.

The stationary member receiving ring includes a first annular groove 188 that is disposed in a parallel plane with a second annular groove 192. The first annular groove 188 is provided for receiving one or more bushing members, such as relatively larger bushing members 196, 198. The bushing members 196, 198 include a radially outwardly facing surface having a tongue radially outwardly surface 200 having a tongue 202 that is receivable by the first annular groove 188. The larger bushing members 196, 198 also include a radially inwardly facing surface 204 having a radially inwardly facing groove 206, for receiving a radially outwardly extending tongue 214 of relatively smaller bushing members 208, 210.

Relatively smaller bushing members 208, 210 have a diameter and a radius of curvature that is generally smaller than the diameter and radius of curvature of the relatively larger bushing members 196, 198. The smaller bushing members 208, 210 are sized and configured to be received interiorly of the larger bushing members 196, 202.

The outer diameter of the smaller bushing members 208, 210 is generally approximately equal to the inner diameter of the larger bushing members 196, 202, so that the outwardly facing surface 212 and tongue 214 of the smaller inner bushing members 208, 210 can be received by the radially inwardly facing surface 204 and groove 206 of the relatively larger bushing members 196, 198, to fit in a concentric engaging relation therewith. The radially inner surfaces of the smaller diameter bushing members 208, 210 define a relatively smaller inner diameter defined by radially inwardly facing surface 218, than the relatively larger inner diameter provided by the radially inwardly facing surface 204 of the relatively larger bushing members 202.

The radially inwardly facing surface 218 of the smaller bushing members 208, 210 also includes a groove 220, that may receive an even smaller, third order bushing member (not shown) that is configured generally similar to smaller bushing members 208, 210 but had an outer diameter and tongue, not shown, that were sized and configured for being received by the inner surface 218 and groove 220 of the smaller bushing member. In some circumstances, a disk-shaped solid plug having a radially outwardly extending tongue could be inserted into the groove 220 of the smaller bushings to serve as a plug.

It will be appreciated that the use of the bushing member (and their absence) enables the stationary member receiving portion 68 to have three available diameters. The largest diameter would exist when the two bushing members 196, 198, 208, 210 were absent.

Placing the larger bushing members 196, 198 into the upper annular groove 188 would present an effective inner diameter of the aperture that was generally equal to the inner diameter defined by the inner surface 208 of the larger bushing member2 196, 198. The addition of the smaller bushing members 208, 210 would create an effective inner diameter that was generally equal to the inner diameter defined by the inner surface 218 of the smaller bushing members 208, 210.

The diameters are different so that the device can accommodate different sized quills. However, sometimes an additional diameter reduction is needed. In such cases, one can employ shims 224. Shims 224 generally comprise magnetic strips that have the thickness of a stick-on magnet, or a thickness that is slightly greater than the diameter of foam-type, double-stick tape.

These shims 224 can be adhesively or magnetically attached to the quill member, and positioned adjacent to the interior facing surfaces of the larger 196, 198 or smaller 208, 210 bushing members as appropriate, or else to the inner facing surface 228.

The second annular groove 192 is generally identical to the first annular groove 188 in size, position and configuration. However, the second or lower annular groove 198 is positioned for receiving a radially outwardly extending annular rim 198 that is formed in the proximal portion of a tubular member, as shown in FIG. 8.

Preferably, the shims 224 can be made to have different thicknesses. For example, a pair of 1.2 mm shims 224 are is provided with the product along with 0.6 mm shims 224. The shims 224 are preferably magnetic so that they can be magnetically attached on to a quill 40 that is typically metal. This magnetic attraction holds the shims 224 in place and makes it easier to attach the fitting.

A tubular bellow 94 is best shown in FIGS. 8 and 18-21.

Figure 20:
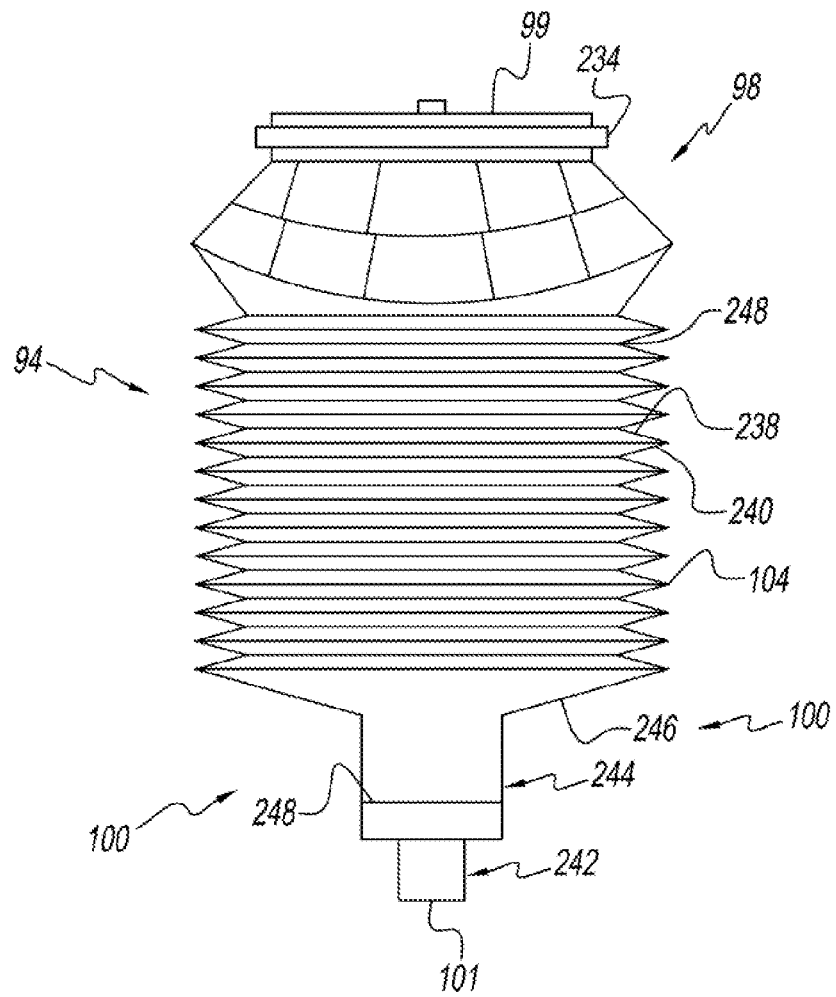
FIG. 20 is a front view of the bellows of the present invention showing the device in a compressed position.

A tubular bellows 94 includes a proximal portion 98 having an open proximal end 99, along with the distal portion 100 that includes an open distal end 101. A middle portion 102 extends between the proximal portion 98 and the distal portion 100. The middle portion includes a plurality of bi-staple pleats 104. As discussed above, the bi-staple pleats 104 are movable between a compressed position as shown in FIG. 20 and an expanded position as shown in FIG. 18.

The cylindrical neck 236 of the proximal portion 98 is sized to be received by the bellows receiving aperture 228 of the stationary member receiving portion 68. The bellows receiving portion 228 includes an annular interior groove 192, that is sized and configured for receiving a complimentary annular outwardly extending rim or ridge 234. The annular ridge or rim 234 is designed to be received within the complimentary radially inwardly opening annular groove 192 that is formed in the bracket 62. It is designed so that the rim 234 and groove 192 can work as a snap fit connection, so that if the tubular member 94 is made of sufficiently flexible material, the tubular member can be snap fit into connection with the groove 192. Alternately, the screws 122, 124 of the bracket member 62 can be loosened to enable the rim 234 to be fitted into the groove 192, with the screws then tightened to lock the tubular bellows 94 into position.

Alternately, the tubular proximal end 98 may have the upstanding neck portion 236 formed to be elongated with the annular ridge 234 designed to be thread shaped to threaded engage a thread-shaped annular groove 192 of the bracket.

When sizing the neck 236, rim 234 and groove 192, it is helpful to provide the neck 236 with a sufficient height, and the rim 234 with the sufficient outward extent so that rim 234 engages the groove 192, an that the rim 234 is held well within the groove 192, while ensuring that the radially outward extent of the rim 234 is not so great so as to make it difficult to snap fit.

The bellows 94 middle portion 102 comprises a plurality of bi-staple pleats 104. The pleated portion comprises a plurality (here 13) of pleat segments that are movable between a compressed position and an expanded position. In a compressed position, each of the pleats 104 includes a first radially extending surface 238, and a second radially extending surface 240 that meet at a peak 244. A pleat 104 is joined to another peak by a reduced diameter nadir surface 248.

When the pleat 104 is in its compressed position, the two radially extending pleat walls 238, 240 are disposed almost parallel to each other. When the pleat 104 is in its expanded position, the first and second radially extending pleat surfaces 238, 240 are disposed at an angle to each other, such as a 30 degree angle, or a 45 degree angle from each other.

The use of hi-stable pleats 104 enable the bellows 94 to assume a rest position either in its compressed configuration or in its expanded configuration. As such, a pleated bellows 94 differs from a typical corrugated tube that has only a single rest position. If a corrugated tube is moved from its single rest position, either by the expansion or compression of the length of the tube, the tube will exert a force against this expansion or compression to bring the corrugated tube back to its natural single rest position. However, with a pleated tube, the device (and actually each pleat of the device), can be moved into either its compressed position or its expanded position, and be maintained there without the exertion of any force on the pleat to maintain it in its desired rest or expanded position.

The pleated tube is in a relatively stress free condition when it is either in its expanded or compressed position. As such, if one takes a particular pleat and moves it from its compressed position to its expanded position, there is no compressive force being exerted on the tube to cause it to want to move it back to its compressed position. Similarly, if one moves a pleat 104 in a pleated tube 94 from its expanded position to its compressed position, there is no expansive force that is being exerted by the pleat by the tube to move the tube and pleat back to its expanded position. As such, if one had a pleated tube 94 with a certain number of pleats (e.g. 14 in a most preferred embodiment), and if one were to expand 7 of the 14 pleats to their expanded position), one could then release the tubular so that no force or holding power was exerted on the pleated tube. This absence of exerted force on the pleated tube would have no discernable effect on the pleated tube, in so far as the pleated tube would tend to stay at that length, as no force was being exerted on it to move back to another position.

One can appreciate, the use of a pleated tube enables the tubular bellows 94 of the present invention to assume a large and varied number of positions. In particular, the number of variable positions is related to the number of pleats. For example, if a pleated tube had 20 pleats in it, it is likely that the pleated tube would have 21 different lengths that it could be adjusted between.

In the first rest position, all of the pleats would be compressed, which would represent the extreme minimum length to which the tubular bellows would be compressed. One could then engage in the next longer rest position by moving one pleat from its compressed position to its expanded position. This could be followed up sequentially to move additional pleats from their compressed position to expanded position to change the length of the pleat in one pleat increments from zero pleats in their expanded position to all of the pleats being in their fully expanded position.

FIG. 20 shows all of the pleats in the compressed position, and FIG. 18 shows all of the pleats in their expanded position.

One benefit of the use of the pleated tube 94 of the present invention is that it enables the user to establish the length of the tubular bellows 94 at the appropriate length for the particular drill and chuck arrangement that is being used on the drill or drill press that the user is working on. As such, when one moves from a larger diameter (longer) drill to a smaller diameter (shorter) drill, one not only changes the diameter of the drill, but often, changes the length of the drill as smaller diameter drill its tend to be built to have a short length than larger diameter drills. By having multiple pleats, the user can adjust the length of the tubular bellows 94 to fit both shorter and smaller drills, along with longer length and greater diameter drills.

One benefit of the present invention is that once the length the tubular bellow 94 is set through the appropriate adjustment of the pleats, the set length will be held. Optimally, the distal end 101 of the bellows 94 is positioned approximately one to two inches above the distal tip 50 of the drill bit several benefits are obtained by placing the distal end 101 in this position, and using the bi-staple pleats 104 to hold the length of the tubular bellows 94 in this position. One benefit is that the distal end 101 of the bellows 94 is spaced from the distal end 50 of the drill 46. This enables the user to view the area between the drill 46 and the workpiece WP to enable the user to better visually determine whether he is performing an appropriate function on the workpiece WP.

The second advantage found by the Applicant is that the bellows operate most efficiently when there is a small space between the distal end 101 of bellows 94 and the workpiece WP. If one were to engage the distal end 101 of the bellows so that it rested upon the workpiece WP, one would restrict the flow of air into the interior of the bellows 94. In doing so, one would restrict the ability of the vacuum to draw in debris that is generated by the engagement of the drill bit with the workpiece.

By enabling the pleats 104 of the tubular bellows 94 to fixedly position the relative position of the distal end 101 of the bellows 94, on the upper surface of the workpiece so that an appropriately sized space exists, the user can help to ensure that the debris is drawn most efficiently into the interior of the bellows 94 and hence, not allowed to become airborne in the workplace.

Another surprising aspect of the present invention is that the applicant has found that there is benefit obtained by being able to adjust the size of the diameter of the open end 101 of the bellows.

As best shown in FIG. 18, the distal portion 100 of the bellows 94 includes three distinct different diameter portions. At the most distal end, there is a smallest diameter portion 242. Disposed proximally of the smallest diameter portion 242 is an intermediate diameter portion 244. The widest diameter portion 246 is that portion of the tubular bellows 94 that is at the distal end of the middle portion 102, and comprises the lower most pleat.

The tubular bellows 94 is designed so that the user can use any of the three diameter portions 242, 244, 246.

When shipped from the factory, the device preferably appears as it does in FIG. 18 with the smallest diameter portion 242, the intermediate diameter portion 244 and the largest diameter portion 246 all in place.

The smallest diameter portion 242 is wide enough to accept most commonly used small drills, while still providing a sufficient air passage around the exterior of the drill bit, to enable debris to be inhaled by the vacuum source. In this regard, the applicant has found that generally the smallest diameter of the opening 101, the greater the velocity of air flow pass the drill bit, and hence, the greater suction power. Additionally, the smaller diameter provides a greater contact with the drill 46 that helps to cool the drill 46, and prevents the drill from over heating. Sometimes however, the small diameter portion 242 is either too small to receive the drill bit or does not provide enough of a space for debris to flow past the drill bit 46. In such cases, one should employ the intermediate portion, by cutting the end of the tubular member at score line 248.

Although the cut can occur anywhere along the intermediate portion 244, the score line 248 provides a convenient cutting spot.

Although the intermediate portion does provide a larger diameter opening, certain tools, such as staid bits and larger diameter bits such as hole saws spade bits and forstner bits have a size that does not permit them to be received within the intermediate portion 244. In such cases, the device should be trimmed such as by cutting the apex 244 of the lower most pleat 246, so that the opening at the distal end 101 has a diameter that is approximately the same diameter as the tubular bellows.

In a most preferred embodiment, this diameter is between about three and four inches.

By doing so, one can use the tubular bellows more conveniently with larger bits, such as sanding drums, hole saws and possibly also with certain other strap generating tools such as saws with larger blades and the like.

In a most preferred embodiment of the device, the distal end has a diameter approximately 0.75 inches, if the smallest diameter portion 242 is left on. If the device is cut along score line 248 so that the intermediate portion 244 is exposed, the diameter expands to about 1.75 inches. As mentioned above, the diameter at the pleat 246 of the most preferred embodiment is approximately 3.0 to 4.0 inches.

Figure 21:
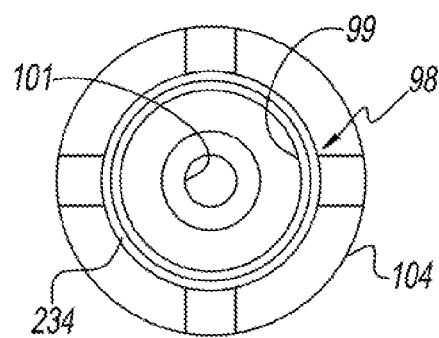
FIG. 21 is a top view of the bellows of the present invention.

An alternate embodiment is shown in FIG. 21. The alternate embodiment of FIG. 21 is designed for use in connection with portable hand drills. In such case, the bracket member is configured differently to fit onto a hand drill.

The alternate embodiment debris removing device 300 shown in FIG. 22 includes a bracket 302 and a tubular bellows 314. The bracket 302 includes a tube shaped axially extending stationary member receiving portion 304 that has a first enlarged end for receiving the quill of the portable drill. The distal end of the axially extending portion 305 terminates at its distal end at an axially extending bellows receiving portion 306. The axially extending portion 305 is formed to have a radially extending branch extending therefrom, that comprises the radially extending vacuum tube receiving portion 310.

The vacuum tube receiving portion 310 is designed to receive the distal end of a vacuum hose. Additionally, as shown in FIG. 22, a solid, pipe like member 312 can be coupled to the radially extending vacuum tube receiving portion so as to provide a handle-like structure that the user can grip to better control the drill. The vacuum tube can then be coupled to this handle portion 316.

The tubular member 314 is generally similar to tubular member 94 insofar as it comprises a plurality of bi-stable pleats. Because the drill is usually smaller than the apparatus of the drill press, the debris removal device 300 is usually scaled down in size, relative to the device 60 shown in the remainder of the figures.

Having described the invention with regard to certain preferred embodiments, it will be appreciated that variations and modifications exist within the scope and spirit of the claims appended hereto.

What is claimed is:

1. A debris removal device for use with a scrap generating power tool having a stationary member and a scrap generating workpiece engaging member movable with respect to the stationary member, the debris removal device comprising:

a bracket having a stationary member receiving portion for coupling the bracket to the power tool stationary member, a vacuum receiving portion for coupling the bracket to a vacuum source and a passageway portion for placing the stationary portion in fluid communication with the vacuum source;

wherein the bracket comprises a first bracket half member and a second bracket half member configured to be removably coupled by at least one fastener, wherein the first and second bracket half members each include a semi-annular portion, and wherein an inner surface of each semi-annular portion includes a first groove;

a first semi-annular bushing member and a second semi-annular bushing member, wherein each bushing member further includes a first tongue extending outwardly from a radially outward surface and a second groove on a radially inwardly facing surface, wherein the first groove of the bracket members is configured to receive the first tongue of the bushing members, and wherein the bushing members are configured to interface with the power tool stationary member and retain the bracket members thereto, should the inner diameter of the power tool stationary member be too small to engage the bracket members directly; and a variable length tubular bellows configured for placement adjacent to the workpiece engaging member, the bellows including a plurality of bi-stable pleats movable between and stationarily positionable in each of an expanded position and a compressed position for permitting the user to vary the length of the bellows between, and fixedly position the length of the bellows at a plurality of different lengths.

2. The debris removal device of claim 1 wherein the pleats of the bellows are capable of being maintained in each of their compressed positions and expanded positions without the exertion of an external force.

3. The debris removal device of claim 1 wherein each of the plurality of pleats is individually movable between a compressed rest position and an expanded rest position to permit the user to vary the length of the bellows between a fully expanded length wherein substantially all of the pleats are in the expanded position, and fully compressed length wherein substantially all of the pleats are in a compressed position, and a plurality of intermediate lengths where some of the pleats are in the expanded position and others of the pleats are in the compressed position.

4. The debris removal device of claim 1, further comprising a third semi-annular bushing member and fourth semi-annular bushing member, wherein an outer diameter of the third and fourth semi-annular bushing members is substantially equal to an inner diameter of the second and third semi-annular bushing members, wherein the third and fourth bushing members further include a second tongue extending outwardly from a radially outward surface and a third groove on a radially inwardly facing surface, wherein the second groove of the first and second bushing members is configured to receive the second tongue of the third and fourth bushing members, and wherein the plurality bushing members permit the bracket to interface with a plurality of power tool stationary members of differing sizes.

5. The debris removal device of claim 1 wherein the bellows includes a proximal end coupled to the bracket and a distal end configured for positioning adjacent to the workpiece engaging member, the proximal end including a snap fit coupler for coupling the bellows member to the bracket.

6. The debris removal device of claim 1 wherein the bellows includes a proximal end configured to be coupled to the bracket and a distal end configured for being positioned adjacent to the workpiece, the proximal end including an axially extending neck portion having a radially outwardly extending annular rib sized and configured for being received by an annular groove formed in the bracket.

7. The debris removal device of claim 1 wherein the bellows includes a proximal end removably engageable with the bracket member and a distal end, the distal end including a relatively enlarged diameter portion and a relatively reduced diameter portion disposed distally of the relatively enlarged diameter portion.

8. The debris removal device of claim 7 wherein the reduced diameter portion includes an opening large enough to receive a drill bit, and wherein the enlarged diameter portion includes a trim line for facilitating the removal of the reduced diameter portion from the distal end of the bellows for providing a larger diameter intake for the bellows.

9. The debris removal device of claim 8 wherein the distal end of the bellows includes an intermediate diameter portion disposed between the reduced diameter portion and the enlarged diameter portion, the intermediate diameter portion includes a second trim line for facilitating the removal of the reduced diameter portion.

10. The debris removal device of claim 4 wherein an outer diameter of the semi-annular bushing members is substantially equal to an inner diameter of the semi-annular portion of the bracket half members.

11. The debris removal device of claim 10 where the scrap generating power tool comprises a drill, and the stationary member receiving portion of the bracket is sized and configured to receiving both a quill of the drill and the bellows coupler, and wherein the bi-stable pleats have a diameter large enough for interiorly receiving a chuck of a drill, wherein the distal end of the bellows has a diameter large enough to interiorly receive the workpiece engaging member, wherein the bellows has a length where at least a portion of the bi-stable pleats are placed in the expanded position, to position the distal end of the bellows within about two inches of a distal end of the workpiece engaging member.

12. The debris removal device of claim 11 wherein the bracket stationary member receiving portion comprises a generally ring-shaped bracket stationary member receiving portion, and the vacuum receiving portion comprises a generally ring-shaped vacuum receiving portion sized and configured for receiving a vacuum hose.

13. The debris removal device of claim 1 wherein the power tool comprises at least one of a hand drill, drill press, rotary tool, router, spiral saw, cutout tool, mortise machine, engraver, rotary hammer, sander, lathe, oscillating tool, saw.

14. The debris removal device of claim 1 wherein the scrap generating tool comprises a drill, the stationary member comprises a quill, the workpiece engaging member comprises an axially disposed bit, further comprising a rotating spindle and a rotating chuck for coupling the bit to the rotating spindle, wherein the bracket includes an axially extending portion having a first end for engaging the quill, and a second end through which the bit can pass, and an axially extending passageway between the first and second ends, a radially extending portion having a radial passageway in fluid communication with the axial passageway, and a radially open coupler for coupling a vacuum source to the bracket.

15. The debris removal device of claim 14 wherein the drill comprises a portable drill, and the vacuum source comprises a vacuum hose.

16. The debris removal device of claim 1 wherein the scrap generating power tool comprises a drill, the stationary member comprises a quill, the workpiece engaging member comprises an axially disposed bit, further comprising a rotating spindle and a rotating chuck wherein the stationary member receiving portion comprises an axially extending ring having a proximal portion sized and configured for fixedly coupling the quill and a distal bracket coupler portion configured for removably coupling the bellows to the bracket, a radially extending vacuum receiving portion sized and configured for receiving a vacuum hose, and wherein the passageway portion extends radially between the axially extending stationary member receiving portion and the radially extending vacuum receiving portion.

17. The debris removal device of claim 1 wherein the stationary member receiving portion includes another ring portion, and at least one radially inwardly extending bushing member for permitting the user to vary the diameter of the stationary member.

18. The debris removal of claim 17 wherein the bushing member comprises a first arcuate bushing member including an outer arcuate surface for engaging the outer ring, and an inner arcuate surface, and a second arcuate bushing member including an outer arcuate surface for engaging the inner arcuate surface of the first bushing member, and an arcuate inner surface capable of defining an aperture for interiorly receiving the stationary member.

19. A debris removal device for use with a drill having a relatively stationary quill, a spindle rotatable with respect to the quill, a chuck coupled to the rotatably spindle for rotation therewith and for removably coupling a workpiece engaging bit, the workspace workpiece engaging bit including a proximal end configured for engaging the chuck for rotation by the chuck and spindle, and a distal end configured for engaging a workpiece for performing an operation on the workpiece, the debris removal device, comprising:
   a bracket having a ring-like stationary member receiving portion for coupling the bracket member to the quill, the stationary member receiving portion including a bracket coupler for engaging a bellows coupler of a bellows, a ring-like vacuum receiving portion for receiving a vacuum hose, and a passageway portion disposed between the stationary member receiving portion and the vacuum receiving portion;
   wherein the bracket comprises a first bracket half member and a second bracket half member configured to be removably coupled by at least one fastener, wherein the first and second bracket half members each include a semi-annular portion, wherein the two semi-annular portions define the ring-like stationary member receiving portion, and wherein an inner surface of each semi-annular portion includes a first groove;
   a first semi-annular bushing member and a second semi-annular bushing member, wherein each bushing member further includes a first tongue extending outwardly from a radially outward surface and a second groove on a radially inwardly facing surface, wherein the first groove of the bracket members is configured to receive the first tongue of the bushing members, and wherein the bushing members are configured to interface with the power tool stationary member and retain the bracket members thereto, should the inner diameter of the power tool stationary member be too small to engage the bracket members directly; and
   a variable length tubular bellows for interiorly receiving the chuck and workpiece engaging drill bit a proximal portion having a diameter great enough to interiorly receive at least the chuck and the workpiece engaging bit, the tubular bellows including a proximal end including a neck having-a the bellows coupler for removably engaging the bracket coupler, a distal portion having an open end through which the workpiece engaging bit can pass and a middle portion including a plurality of bi-stable pleats movable between and stationarily positionable in each of an expanded position and a compressed position for permitting the user to vary the length of the bellow between and fixedly position the length of the bellows at a plurality of different lengths.

20. The debris removal device of claim 19, further comprising a third semi-annular bushing member and fourth semi-annular bushing member, wherein an outer diameter of the third and fourth semi-annular bushing members is substantially equal to an inner diameter of the second and third semi-annular bushing members, wherein the third and fourth bushing members further include a second tongue extending outwardly from a radially outward surface and a third groove on a radially inwardly facing surface, wherein the second groove of the first and second bushing members is configured to receive the second tongue of the third and fourth bushing members, and wherein the plurality bushing members permit the bracket to interface with a plurality of power tool stationary members of differing sizes.

* * * * *